United States Patent
Sato

(10) Patent No.: US 9,778,507 B2
(45) Date of Patent: Oct. 3, 2017

(54) LIQUID CRYSTAL DISPLAY DEVICE

(71) Applicant: LG DISPLAY CO., LTD., Seoul (KR)

(72) Inventor: Osamu Sato, Tokyo (JP)

(73) Assignee: LG DISPLAY CO., LTD., Seoul (KR)

( * ) Notice: Subject to any disclaimer, the term of this patent is extended or adjusted under 35 U.S.C. 154(b) by 89 days.

(21) Appl. No.: 14/850,049

(22) Filed: Sep. 10, 2015

(65) Prior Publication Data

US 2016/0103365 A1    Apr. 14, 2016

(30) Foreign Application Priority Data

Oct. 8, 2014    (JP) .................................. 2014-206984

(51) Int. Cl.
   *G02F 1/1335*    (2006.01)

(52) U.S. Cl.
   CPC .... *G02F 1/133603* (2013.01); *G02F 1/13362* (2013.01); *G02F 1/133605* (2013.01); *G02F 1/133608* (2013.01); *G02F 2001/133614* (2013.01)

(58) Field of Classification Search
   CPC ......... G02F 1/133614; G02F 1/133605; G02F 201/133614
   See application file for complete search history.

(56) References Cited

U.S. PATENT DOCUMENTS

| | | | |
|---|---|---|---|
| 2014/0158982 A1* | 6/2014 | Park | G02B 6/005 257/13 |
| 2015/0036317 A1* | 2/2015 | Yamamoto | G02F 1/133605 362/84 |
| 2015/0197689 A1* | 7/2015 | Tani | C09K 11/025 362/84 |
| 2016/0170262 A1* | 6/2016 | Saneto | G02B 5/26 349/71 |

FOREIGN PATENT DOCUMENTS

| | | |
|---|---|---|
| JP | 2003-005181 A | 1/2003 |
| JP | 2003-188422 A | 7/2003 |
| JP | 2006302863 A | 11/2006 |
| JP | 2009-217259 A | 9/2009 |
| JP | 2011-198930 A | 10/2011 |
| JP | 2013539170 A | 10/2013 |
| KR | 10-2008-0073304 A | 8/2008 |

* cited by examiner

*Primary Examiner* — Kendrick Hsu
(74) *Attorney, Agent, or Firm* — Dentons US LLP

(57) ABSTRACT

A liquid crystal display device includes a liquid crystal panel; and a direct type backlight unit providing light to the liquid crystal panel, wherein the direct type backlight unit includes: a frame where an LED is mounted; a sealing member over the LED and containing quantum dots dispersed in resin or organic solvent; a first polarizer disposed over the sealing member; and a light-recycling structure reflecting light reflected to the frame towards the liquid crystal panel, wherein the liquid crystal panel includes a second polarizer facing the direct type backlight unit, and wherein a transmission axis of the first polarizer is parallel to a transmission axis of the second polarizer.

18 Claims, 3 Drawing Sheets

LIQUID CRYSTAL DISPLAY DEVICE

CROSS-REFERENCE TO RELATED APPLICATIONS

The present application claims the benefit of Japanese Patent Application No. 2014-206984 filed in Japan on Oct. 8, 2014, which is incorporated by reference in its entirety for all purposes as if fully set forth herein.

BACKGROUND OF THE INVENTION

Field of the Disclosure

The present disclosure relates to a liquid crystal display (LCD) device using a direct type backlight unit.

Discussion of the Related Art

As a backlight unit applied to a related art LCD device, an edge-light type backlight unit has been known in which a light source is disposed at an edge of a light guide plate and light emitted from the light source is provided to a liquid crystal panel.

However, since the edge-light type backlight unit requires the light guide plate, there is a problem that, particularly, a large-sized LCD device becomes heavier. Additionally, in the edge-light type backlight unit, since the light source is disposed at the edge of the light guide plate, a bezel area around the liquid crystal panel needs to be widened, and there is a problem that the design is not good.

Meanwhile, in comparison with the edge-light type backlight unit, a direct type backlight unit has been known in which a light source is disposed at a rear side of a liquid crystal panel and light emitted from the light source is diffused and concentrated by combinations of various optical films (a diffusion sheet, a prism sheet, a lens sheet, etc.) and is provided to the liquid crystal panel.

In addition, as the direct type backlight unit, a backlight assembly including a plurality of light sources and a plurality of optical lenses corresponding to the light sources has been suggested in which each optical lens includes a central lens portion having a convex shape, a peripheral lens portion having a concave shape and formed outside the central portion, and a light guiding portion extending from the peripheral portion (referring to Japanese Patent No. 4959971, for example).

However, since the direct type backlight unit is disposed at the rear side of the liquid crystal panel, there is a problem that a thickness of a display device becomes thicker. Moreover, as a common problem of the LCD device, there is a problem that utilization efficiency of light is low because most of the light emitted from the light sources is absorbed by a polarizer, which is disposed at a light incident surface of the liquid crystal panel (a surface adjacent to the backlight unit).

A method of using a lens material having a high refractive index has been suggested to decrease a thickness of the direct type backlight unit. However, in general, the high refractive index is about 1.7, and to further improve the thickness, it is needed to use a special material, which is expensive.

Furthermore, to increase the utilization efficiency of light of the LCD device, another method has been known in which a polarizing optical film is disposed between the liquid crystal panel and the direct type backlight unit, P wave of light from the directly type backlight unit (polarized component wave parallel to the light incident surface) is transmitted while S wave (polarized component wave perpendicular to the light incident surface) is reflected toward the direct type backlight unit, and the S wave is reflected by a reflector disposed around the light sources of the direct type backlight unit and is recycled. An example of the polarizing optical film is a dual brightness enhancement film (DBEF), which includes multiple layers having different refractive indexes.

However, in the LCD device having the above-mentioned structure, the size of the polarizing optical film should be almost the same as the size of the liquid crystal panel. Moreover, since the polarizing optical film includes the multiple layers, there is a problem that the costs increase particularly when the LCD device has a large size. Furthermore, conversion efficiency from S wave to P wave of the polarizing optical film is not 100%, and a new breakthrough is needed to accomplish further high utilization efficiency of light at low cost.

In general, a cold cathode fluorescent lamp (CCFL) and a light emitting diode (LED) have been known as the light sources of the direct type backlight unit. The LED is suitable for the light sources of the LCD device because the LED has low power consumption and a small size as compared to the light sources.

Meanwhile, it is important to increase color reproduction characteristics of the LCD device according to practical applications of an organic EL display. Color display of the LCD device can be realized by making light with some wavelength range of light emitted from a white light source absorbed by a color filter. To increase the color reproduction characteristics of the LCD device, it is effective to narrow the wavelength range of light passing through the color filter, and on the other hand, there is a problem of lowering utilization efficiency of light. To solve the problem, it is needed that light with a narrow wavelength range corresponding to the three primary colors of light is emitted from the light source and the wavelength range of light emitted from the light source is matched with the wavelength range of light transmitted by the color filter.

With this background, recently, a backlight unit including a combination of the LED and a quantum dot (QD) has been actively studied (referring to Japanese Patent Publication No. 2013-539170, for example).

The quantum dot uses light from the LED as an excitation source and emits light with a longer wavelength than that of the excitation source. In addition, the wavelength of the light emitted by the quantum dot can be controlled by changing the type and the size of the quantum dot. Moreover, the quantum dot has high quantum efficiency approaching that of YAG (yttrium aluminum garnet) fluorescent material. Therefore, it is possible to obtain a backlight unit having desired emission color, high brightness and emission spectrum with a narrow full width at half maximum (FWHM) by using the quantum dot. Furthermore, it is possible to manufacture an LCD device having wide color gamut due to the backlight unit using the quantum dot.

However, there is a problem that the quantum dot is degraded in a short time when it receives light from the LED in the presence of moisture and oxygen. Additionally, when the quantum dot is close to the LED of the excitation source, the degradation of the quantum dot is accelerated in circumstances of large amount of light and high temperature.

SUMMARY OF THE INVENTION

Accordingly, the present invention is directed to an LCD device that substantially obviates one or more problems due to limitations and disadvantages of the related art.

An object of the present invention is to provide an LCD device that includes a direct type backlight unit, which prevents the degradation of the quantum dots and has the desired emission color, the relatively high brightness, the emission spectrum with a relatively narrow full width at half maximum (FWHM), and the relatively long lifetime, and that has the relatively thin thickness, improves the utilization efficiency of light, decreases the power consumption, and increases the range of color reproduction at low cost.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages, and in accordance with the purpose of the present invention, as embodied and broadly described herein, the present invention provides a liquid crystal display device including a liquid crystal panel; and a direct type backlight unit providing light to the liquid crystal panel, wherein the direct type backlight unit includes: a frame where an LED is mounted; a sealing member over the LED and containing quantum dots dispersed in resin or organic solvent; a first polarizer disposed over the sealing member; and a light-recycling structure reflecting light reflected to the frame towards the liquid crystal panel, wherein the liquid crystal panel includes a second polarizer facing the direct type backlight unit, and wherein a transmission axis of the first polarizer is parallel to a transmission axis of the second polarizer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Figure 1:
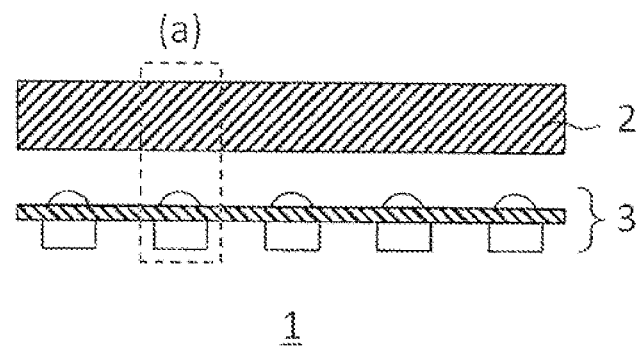
FIG. 1 is a schematic cross-sectional view illustrating an LCD device according to the present invention.

Reference will now be made in detail to embodiments of the present invention, examples of which are illustrated in the accompanying drawings. In addition, the same or similar parts in the drawings will be designated by the same reference numbers.

FIG. 1 is a schematic cross-sectional view of illustrating an LCD device according to the present invention. In FIG. 1, the LCD device 1 of the present invention includes a liquid crystal panel 2 and a direct type backlight unit 3 providing light to the liquid crystal panel 2. The direct type backlight unit 3 is arranged to oppose and face the liquid crystal panel 2. Additionally, although it is shown that the direct type backlight unit 3 includes five light sources (LED) in FIG. 1 as an example, the number of the light sources is not limited and is able to be appropriately controlled depending on a size of the LCD device to be manufactured.

Figure 2:
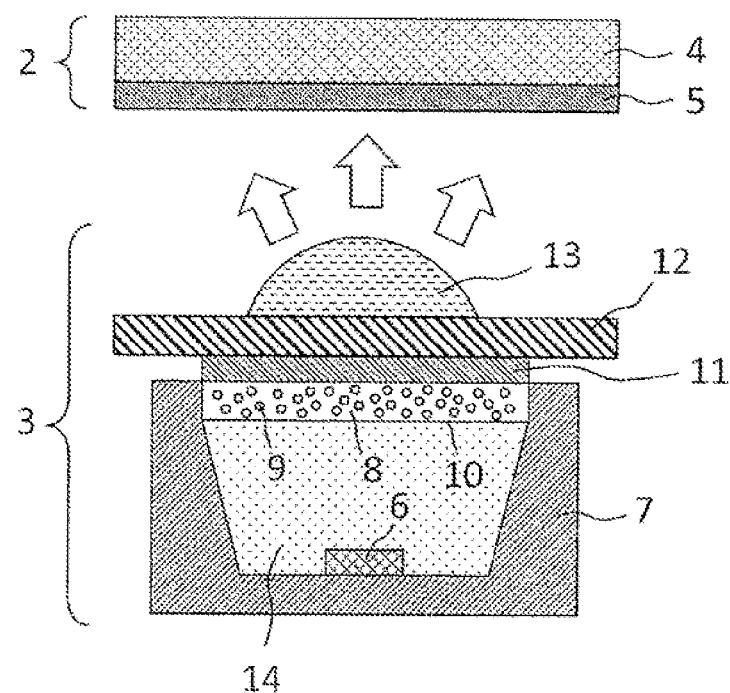
FIG. 2 is a cross-sectional view enlarging a significant part (a) of the LCD device of FIG. 1.

FIG. 2 is a cross-sectional view enlarging a significant part (a) of the LCD device of FIG. 1. In FIG. 2, the liquid crystal panel 2 includes a liquid crystal layer 4 and a second polarizer 5, which is disposed at a side of the liquid crystal layer 4 facing the direct type backlight unit 3. The second polarizer 5 can transmit only light that radiates in a certain direction. In addition, although other components of the liquid crystal panel 2 excluding the liquid crystal layer 4 and the second polarizer 5 are not shown in FIG. 2, the liquid crystal panel 2 may include publicly known components in the art such as a plurality of substrates, another polarizer, and so on.

The direct type backlight unit 3 includes a frame 7 where an LED 6 is mounted, a sealing member 10 disposed over the LED 6 and containing quantum dots 9 dispersed in resin or organic solvent 8, and a first polarizer 11 disposed over the sealing member 10. Moreover, although not required, the direct type backlight unit 3 may further includes a substrate 12 disposed over the first polarizer 11 and a lens 13 disposed over the substrate 12.

The frame 7 is not particularly limited if it is possible to mount the LED 6, and a frame publicly known in the art can be used.

A material for the frame 7 is not particularly limited but is able to be made of resin selected from polycarbonate, polyphthalamide, nylon (registered trademark), polyethylene terephthalate, polybutylene terephthalate, PC/ABS (polycarbonate/acrylonitrile butadiene styrene) alloy, and so on.

A shape of the frame 7 is not particularly limited, but it is beneficial that the frame 7 has a concave portion. Especially, the concave portion has an upper diameter larger than a lower diameter and includes an inclined side surface, whereby luminous efficiency can be increased. The frame 7 having the above-mentioned shape may be fabricated by a method publicly known in the art such as an injecting molding, etc.

The LED 6 mounted on the frame 7 is not particularly limited, but an LED publicly known in the art such as a blue LED, a green LED, a red LED, and so on can be used. Among them, when white light is produced by a combination of light from the LED 6 and light from the quantum dots 9, the LED 6, beneficially, may be a blue LED. Additionally, although not shown, the LED 6 may be connected to a lead electrode and may generate light due to electrical signals applied through the lead electrode.

The sealing member 10 disposed over the LED 6 contains the quantum dots 9 dispersed in the resin or organic solvent 8.

The sealing member 10 is not particularly limited and beneficially is a container made of glass or resin. Especially, it is desirable that the sealing member 10 is a glass cell, which has excellent effects of blocking moisture and oxygen.

Figure 3:
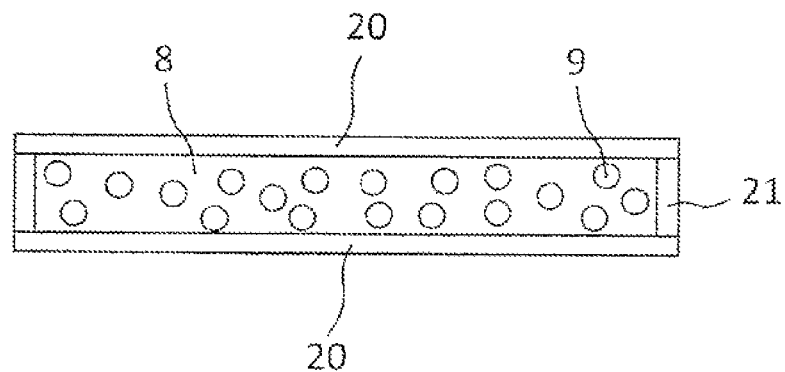
FIG. 3 is a schematic view showing a glass cell.

In the description, a 'glass cell' means a glass member having an interior space that can be filled with the resin or organic solvent 8 dispersing the quantum dots 9 as a layer. More specifically, the glass cell includes at least two glass plates and has a structure that the layered interior space is formed between the two glass substrates. For example, as shown in FIG. 3, the glass cell has a structure that a glass wall 21 is interposed between two glass plates 20 and the two glass plates 20 oppose and face each other with a distance therebetween. The shape of the glass plates 20 is not limited on a plane shape, and the glass plates 20 may have a curved shape.

In the description, the 'quantum dots 9' are a nanoscale material that has an optical property according to quantum mechanics and means a very small-sized semiconductor particle that has a diameter of generally 1 nm~100 nm, beneficially 1 nm~50 nm, and more beneficially 1 nm~20 nm. The quantum dots 9 absorb a photon having energy larger than band gap energy (energy difference between valence band and conduction band) and emit light having a wavelength corresponding to its diameter. Accordingly, the quantum dots 9 absorb light with wavelengths less than a certain wavelength and are able to emit light with various wavelengths by controlling its diameter.

In general, the quantum dots 9 include one or more semiconductor materials. The semiconductor materials, which are not limited, may include elements in Group IV, compounds of Group II-VI, compounds of Group II-V, compounds of Group compounds of Group III-V, compounds of Group IV-VI, compounds of Group compounds of Group II-IV-VI, compounds of Group II-IV-V, and so on. Specifically, the semiconductor materials may include ZnO, ZnS, ZnSe, ZnTe, CdO, CdS, CdSe, CdTe, MgS, MgSe, GaAs, GaN, GaP, GaSe, GaSb, HgO, HgS, HgSe, HgTe, InAs, InN, InP, InSb, AlAs, AlN, AlP, AlSb, TlN, TlP, TlAs, TlSb, PbO, PbS, PbSe, PbTe, Ge, Si, etc.

Moreover, the quantum dots 9 may have a core-shell structure that is composed of a core including one or more semiconductor materials and a shell including one or more semiconductor materials. Specifically, the quantum dots 9 may include a quantum dot having CdSe as the core and CdZnS as the shell (red emission), a quantum dot having CdZnSe as the core and CdZnS as the shell (green emission), and a quantum dot having CdS as the core and CdZnS as the shell (blue emission).

In FIGS. 2 and 3, although the quantum dots 9 each have a spherical shape, the shape of the quantum dots 9 is not limited on the spherical shape, and the quantum dots 9 may have one of various shapes such as a rod shape, a plate shape, and so on.

The quantum dots 9 having the above-mentioned features may be publicly known in the art and may be fabricated by a publicly-known method.

The resin for dispersing the quantum dots 9 is not particularly limited, and resin publicly known in the art can be used. Among them, it is beneficial that epoxy resin, urea resin and silicone resin, which have excellent dispersibility and barrier to moisture and oxygen, are used as the resin.

The organic solvent for dispersing the quantum dots 9 is not particularly limited, and organic solvent publicly known in the art can be used. The organic solvent, beneficially, has a relatively high boiling point (desirably, boiling point equal to or more than 100 degrees of Celsius) such that the quantum dots 9 are well dispersed. The organic solvent may include toluene, styrene, xylene, and so on, for example.

A shape of the sealing member 10 containing the quantum dots 9 dispersed in the resin or organic solvent 8 may be properly determined according to the concave portion of the frame 7 and is not particularly limited. Specifically, it is desirable that the sealing member 10 has a structure corresponding to the shape of the concave portion (opening) of the frame 7.

In addition, the sealing member 10 beneficially does not directly contact the LED 6. Since the surface temperature of the LED 6 becomes a considerably high temperature, the decline of fluorescence efficiency, which may be caused by degradation of the quantum dots 9 due to heat generated by the LED 6, can be prevented by placing the sealing member 10 separately from the LED 6.

In the case that the sealing member 10 is placed separately from the LED 6, a space 14 is put between the LED 6 and the sealing member 10 as shown in FIG. 2.

Figure 4:
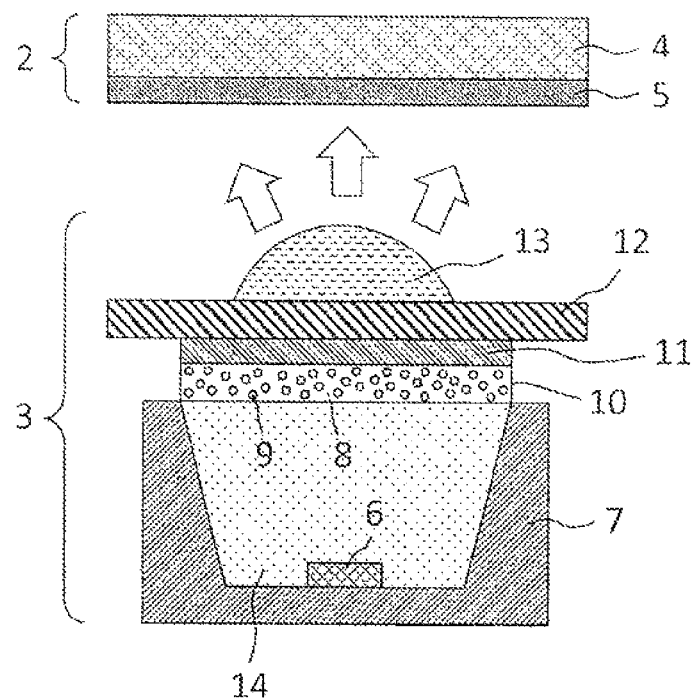
FIG. 4 is another cross-sectional view enlarging a significant part (a) of the LCD device of FIG. 1.

Moreover, although the sealing member 10 is placed in the concave portion of the frame 7 as shown in FIG. 2, the sealing member 10 may be disposed over the concave portion of the frame 7 as shown in FIG. 4.

In the sealing member 10, the quantum dots 9 absorb light from the LED 6 and are excited to thereby generate light having a wavelength longer than the light from the LED 6. Therefore, desired emission color can be realized by controlling the type of the LED 6 and the type and number of the quantum dots 9. Particularly, when white light is realized, it is beneficial that the LED 6 may be a blue LED and the quantum dots 9 may include a first quantum dot, which is excited by blue light (absorbing blue light) and emits light having a peak wavelength within a range of 510~610 nm, desirably, 520~580 nm, and a second quantum dot, which is excited by blue light (absorbing blue light) and emits light having a peak wavelength within a range of 600~700 nm, desirably, 610~680 nm. Accordingly, white light can be realized by the combination of blue light from the blue LED, green light from the first quantum dot, and red light from the second quantum dot.

It doesn't matter that the space 14 between the sealing member 10 and the LED 6 may be air itself, and the space 14 may be filled with inert gas such as nitrogen or sealing resin. The sealing resin is not particularly limited, and resin publicly known in the art can be used. Additionally, the sealing member may be the same as the resin for dispersing the quantum dots 9.

Furthermore, the space 14 may be filled with the sealing resin where particles are dispersed. Since light from the LED 6 can be scattered by using the sealing resin where minute particles are dispersed, light is uniformly irradiated to the quantum dots 9, and thus light can be uniformly emitted from the quantum dots 9. The particles are not particularly limited, and particles publicly known in the art can be used.

The first polarizer 11 disposed over the sealing member 10 transmits only light that vibrates in a certain direction.

The first polarizer 11 beneficially is a reflective polarizer. By using the reflective polarizer, only P-wave of light incident on the reflective polarizer is transmitted while S-wave is reflected.

In general, a metal plate including optical slits may be used as the reflective polarizer. In the present invention, the desirable reflective polarizer is a wire-grid polarizer. The wire-grid polarizer, in which metal lines are arranged with a pitch of 50~100 nm, for example, transmits light (P-wave) vibrating in a direction perpendicular to the metal lines and reflects light (S-wave) vibrating in a direction parallel to the metal lines. Additionally, since the wire-grid polarizer has high heat resistance, the wire-grid polarizer is the optimum to be used near to the LED 6 exposed to high temperatures.

The first polarizer 11 is installed to correspond to each LED 6, which is disposed in the direct type backlight unit 3. Specifically, the number of the first polarizer 11 is the same as the number of the LEDs 6. Moreover, the size of the first polarizer 11 is not particularly limited and is controlled depending on the sizes of the LED 6, the sealing member 10, and the lens 13. Furthermore, while costs increase because the DBEF and the reflecting plate having almost the same size as the liquid crystal panel are used in the direct type backlight unit of the related art, costs can be reduced because the first polarizer 11 is installed to have the size corresponding to the LED 6 in the present invention.

When the reflective polarizer is used as the first polarizer 11, a light-recycling structure can be formed by using a reflective frame as the frame 7 or disposing a reflecting plate on a surface of the frame 7 at a side where the LED 6 is mounted. The reflective frame 7 is not particularly limited and may be formed of a resin material having relatively high reflectance, for example. In addition, the reflecting plate disposed on the surface of the frame 7 is not particularly limited, and a metal plate having relatively high reflectance may be used.

The P-wave of light from the LED 6 and the quantum dots 9 of the sealing member 10 is transmitted by the first polarizer 11 while the S-wave is reflected towards the LED 6 by the first polarizer 11. The reflected light is reflected towards the first polarizer 11 by the reflective frame 7 or the reflecting plate on the surface of the frame 7 at the side where the LED 6 is mounted. Since the polarizing state of light is changed when the light is reflected, the S-wave can be changed into P-wave, which can be transmitted by the first polarizer 11, with an efficiency of almost 100% by repeating reflection.

Figure 5:
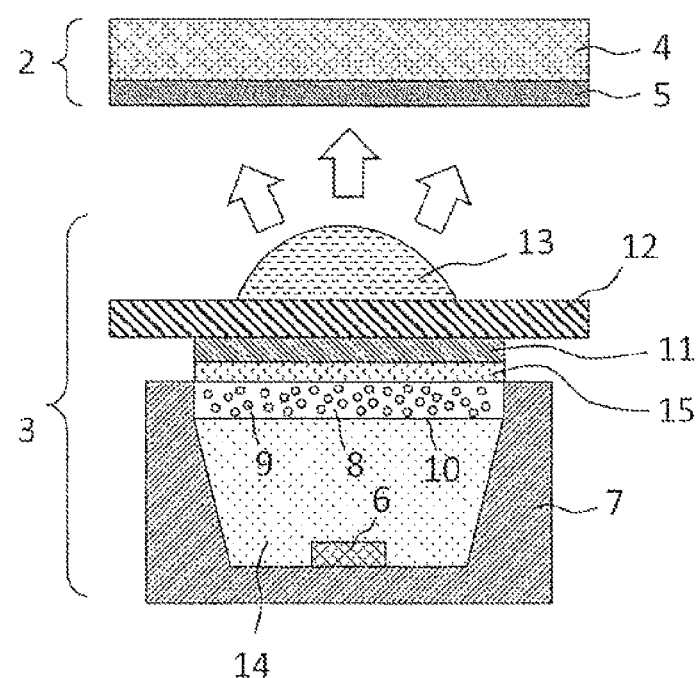
FIG. 5 is another cross-sectional view enlarging a significant part (a) of the LCD device of FIG. 1.

Alternatively, an absorptive polarizer may be used as the first polarizer 11. When the absorptive polarizer is used as the first polarizer 11, as shown in FIG. 5, a polarizable optical film 15 is disposed between the first polarizer 11 and the sealing member 10. The polarizable optical film 15 is not particularly limited, and a film including multiple thin films having different refractive indexes such as DBEF, for example, may be used. The polarizable optical film 15 can transmit P-wave of incident light and reflect S-wave like the reflective polarizer. Therefore, the light-recycling structure is formed between the polarizable optical film 15 and the reflective frame 7 or the reflecting plate.

Moreover, when the absorptive polarizer is used as the first polarizer 11, it is beneficial that a direction of a transmission axis of the absorptive polarizer corresponds with a direction of a transmission axis of the polarizable optical film 15, that is, the transmission axis of the absorptive polarizer is parallel to the transmission axis of the polarizable optical film 15. Accordingly, since light passing through the polarizable optical film 15 is not absorbed and is totally transmitted by the absorptive polarizer, the same effect as the reflective polarizer can be obtained.

The direction of the transmission axis of the first polarizer 11 accords with the direction of the transmission axis of the second polarizer 5 of the liquid crystal panel 2, that is, the transmission axis of the first polarizer 11 is parallel to the transmission axis of the second polarizer 5. By matching the transmission axes, it is possible that all light passing through the first polarizer 11 is transmitted by the second polarizer 5. Therefore, the utilization efficiency of light increases, and the power consumption decreases.

The second polarizer 5 is not particularly limited, and a polarizer publicly known in the art can be used. In addition, the same one as the first polarizer 11 may be used as the second polarizer 5.

A heat sink (not shown) may be installed at an outer surface of the frame (an opposite side to the side where the LED 6 is mounted) to radiate heat generated from the LED 6 as occasion demands.

The substrate 12 may support the direct type backlight unit 3. The substrate 12 is not particularly limited if it has high transmittance, and a thing publicly known in the art can be used. An example of the substrate 12 may be glass or transparent resin.

Generally, in the direct type backlight unit 3, since a plurality of LEDs 6 is disposed under the liquid crystal panel 2, the number of LEDs 6 increases. To decrease the number of LEDs 6, a certain distance is required between the LEDs 6 and the liquid crystal panel 2 such that light of the LEDs 6 is diffused, and thus a thickness of the LCD device 1 including the direct type backlight unit 3 tends to be thick as compared with an LCD device including an edge-light type backlight unit.

From a point that the LCD device 1 has a thin thickness while the number of the LEDs 6 decreases, it is beneficial that the lens 13 having a relatively high refractive index is disposed over the first polarizer 11. By the way, in general, high refractive materials have a refractive index of about 1.7, and an expensive material needs to be used when more improvement is required.

In the present invention, to form the lens 13 having the relatively high refractive index at relatively low cost, the lens 13 is beneficially formed of a uniaxially-oriented liquid crystal resin material such as bis(biphenyl)diacetylene materials or dinaphthyl-acetylene materials, for example.

The uniaxial orientation of the liquid crystal resin material for the lens 13 is not particularly limited and may be achieved by a rubbing method, a photo-aligning method, a method of applying shear stress, and a magnetic field aligning method. Alternatively, a uniaxially-oriented crystal material may be used instead of the uniaxially-oriented liquid crystal material.

The lens 13 formed of the liquid crystal resin material may have a relatively high extraordinary refractive index ne, which corresponds to a length-directional refractive index of the liquid crystal resin material, and a relatively high difference Δn between the extraordinary refractive index ne and an ordinary refractive index no, which corresponds to a width-directional refractive index of the liquid crystal resin material. The extraordinary refractive index ne may be about 2.0, and the difference Δn between the extraordinary refractive index ne and the ordinary refractive index no may be about 0.4. Accordingly, by using the length-directional refractive index ne of the liquid crystal resin material, the lens 13 having the relatively high refractive index can be manufactured at relatively low cost. Therefore, the number of the LEDs 6 can be reduced, and the LCD device 1 can have the relatively thin thickness.

An optical axis (a direction corresponding to the refractive index ne) of the lens 13 formed of the liquid crystal resin material, beneficially, is matched with the direction of the transmission axis of the first polarizer 11 and the direction of the transmission axis of the second polarizer 5 of the liquid crystal panel 2. Accordingly, light passing through the first polarizer 11 is incident on the lens 13 parallel to the direction corresponding to the refractive index ne and thus is refracted by the refractive index ne, whereby the light can be transmitted by the second polarizer 5.

According to the LCD device 1 having the above-mentioned structure, since the quantum dots 9 are dispersed in the resin or organic solvent 8 and are contained in the sealing member 10, the degradation of the quantum dots 9 is prevented, and the direct type backlight unit 3, which has the desired emission color, relatively high brightness, emission spectrum with a relatively narrow full width at half maximum (FWHM), and relatively long lifetime. In addition, the direct type backlight unit 3 can have a relatively thin thickness. At the same time, since the direct type backlight unit 3 does not need a space for arranging the LEDs around the liquid crystal panel and does not require a light guide plate differently from the edge-light type backlight unit, a ultra slim bezel can be easily achieved without regard to expansion of the light guide plate due to high temperatures and moisture absorption, and thus the design is improved. Moreover, by combining the direct type backlight unit 3 and the liquid crystal panel 2, the LCD device 1 may be obtained which can improve the utilization efficiency of light, decrease the power consumption, and increase the range of color reproduction, i.e. color gamut.

Hereinafter, the present invention is described in detail by an exemplary embodiment and a comparative example but is not limited on these.

Embodiment 1

The direct type backlight unit having the structure of FIG. 2 was manufactured. In the direct type backlight unit, a blue LED was used, and the mixture of a first quantum dot and a second quantum dot was used in which the first quantum dot is excited by blue light (absorbing blue light) to thereby emit green light and the second quantum dot is excited by blue light (absorbing blue light) to thereby emit red light. Moreover, silicone resin was used for dispersing the quantum dots. Furthermore, the first quantum dot and the second quantum dot was mixed at a ratio such that blue light from the blue LED, green light from the first quantum dot, and red light from the second quantum dot are combined to thereby produce white light.

Next, the obtained direct type backlight unit was tested for reliability. The reliability test was performed by disposing the direct type backlight unit in a thermo-hygrostat, which was set under the conditions with the temperature of 60 degrees of Celsius and the relative humidity of 90%, flowing currents of 20 mA through the LED to thereby light the direct type backlight unit for 1026 hours, and measuring variation in total luminous flux and chromaticity of the LED at that time. As a result, as compared with the initial value after 1026 hours, the variation in the total luminous flux was +1%, and the variation in the chromaticity was −0.012 at Cx and −0.001 at Cy.

In addition, the color reproduction characteristics were tested for an LCD device, which includes the LED package of the present invention as a light source, and another LCD device, which includes a comparative LED package using YAG (yttrium aluminum garnet) fluorescent material as a light source. The two types of LCD devices have the same structure except for the light sources. As a result of measurements, the color gamut of the LCD device including the LED package using YAG fluorescent material as the light source was about 72% of NTSC while the color gamut of the LCD device including the LED package of the present invention was about 96% of NTSC. The result is a test result of the side edge type backlight, but the same result is expected for the direct type backlight in light of an increase of the color reproduction.

Comparative Example 1

The LED package was manufactured which has the same structure as that of embodiment 1 except for omission of the upper glass plate of the sealing member 10.

Next, the obtained direct type backlight unit was tested for reliability. The reliability test was performed by disposing the direct type backlight unit in a thermo-hygrostat, which was set under the conditions with the temperature of 60 degrees of Celsius and the relative humidity of 90%, flowing currents of 20 mA through the LED to thereby light the direct type backlight unit for 1010 hours, and measuring variation in total luminous flux and chromaticity of the LED at that time like embodiment 1. As a result, as compared with the initial value after 1010 hours, the variation in the total luminous flux was −8%, and the variation in the chromaticity was −0.075 at Cx and −0.117 at Cy.

Comparing the result of embodiment 1 and the result of comparative example 1, it is noted that the variations in the total luminous flux and the chromaticity of the direct type backlight unit of embodiment 1 was considerably reduced as compared with the direct type backlight unit of comparative 1.

From these results, according to the present invention, it is possible to provide an LCD device that includes a direct type backlight unit, which prevents the degradation of the quantum dots and has the desired emission color, the relatively high brightness, the emission spectrum with a relatively narrow full width at half maximum, and the relatively long lifetime, and that has the relatively thin thickness, improves the utilization efficiency of light, decreases the power consumption, and increases the range of color reproduction at low cost.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
a liquid crystal panel; and
a direct type backlight unit providing light to the liquid crystal panel,
wherein the direct type backlight unit includes:
a frame where an LED is mounted;
a sealing member over the LED and containing quantum dots dispersed in resin or organic solvent;
a first polarizer disposed over the sealing member; and
a light-recycling structure reflecting light reflected to the frame towards the liquid crystal panel,
wherein the liquid crystal panel includes a second polarizer facing the direct type backlight unit, and
wherein a transmission axis of the first polarizer is parallel to a transmission axis of the second polarizer.

2. The liquid crystal display device according to claim 1, wherein the sealing member is a glass cell.

3. The liquid crystal display device according to claim 2, wherein the sealing member does not directly contact the LED.

4. The liquid crystal display device according to claim 1, wherein the quantum dots include two or more types of quantum dots that emit different wavelengths respectively.

5. The liquid crystal display device according to claim 1, wherein the LED emits blue light, and the quantum dots include a first quantum dot, which is excited by the blue light and emits light having a peak wavelength within a range of 510~610 nm, and a second quantum dot, which is excited by the blue light and emits light having a peak wavelength within a range of 600~700 nm.

6. The liquid crystal display device according to claim 1, wherein the resin in which the quantum dots are dispersed is at least one selected from a group including epoxy resin, urea resin and silicone resin.

7. The liquid crystal display device according to claim 1, wherein the first polarizer is a reflective polarizer.

8. The liquid crystal display device according to claim 7, wherein the reflective polarizer is a wire-grid polarizer.

9. The liquid crystal display device according to claim 1, wherein the first polarizer is an absorptive polarizer.

10. The liquid crystal display device according to claim 9, wherein a polarizable optical film is disposed between the absorptive polarizer and the sealing member, and a transmission axis of the absorptive polarizer is parallel to a transmission axis of the polarizable optical film.

11. The liquid crystal display device according to claim 1, wherein a lens is disposed over the first polarizer.

12. The liquid crystal display device according to claim 1, wherein the frame is a reflective frame.

13. The liquid crystal display device according to claim 1, wherein a reflecting plate is disposed on a surface of the frame at a side where the LED is mounted.

14. The liquid crystal display device according to claim 1, wherein the sealing member does not directly contact the LED.

15. The liquid crystal display device according to claim 1, wherein the first and second polarizers transmit light vibrating in a predetermined direction.

16. The liquid crystal display device according to claim 15, wherein the first and second polarizers transmit P-wave.

17. The liquid crystal display device according to claim 16, wherein the first and second polarizers reflect S-wave.

18. The liquid crystal display device according to claim 1, wherein the number of the first polarizer is a same as the number of the LED.

* * * * *